United States Patent [19]

Chyung et al.

[11] 4,212,678

[45] Jul. 15, 1980

[54] RAPIDLY CRYSTALLIZED BETA-SPODUMENE GLASS-CERAMIC MATERIALS

[75] Inventors: Kenneth Chyung, Painted Post; John E. Megles, Jr., Corning, both of N.Y.

[73] Assignee: Corning Glass Works, Corning, N.Y.

[21] Appl. No.: 4,042

[22] Filed: Jan. 17, 1979

Related U.S. Application Data

[62] Division of Ser. No. 848,862, Nov. 7, 1977, abandoned.

[51] Int. Cl.$^2$ ................................................ C03C 3/22
[52] U.S. Cl. ..................................... 106/39.7; 65/33; 106/39.8; 106/52; 106/53; 106/54
[58] Field of Search .................. 106/39.7, 39.8, 52, 106/53, 54

[56] References Cited

U.S. PATENT DOCUMENTS

| | | | |
|---|---|---|---|
| 3,013,362 | 12/1961 | Calkins et al. | 106/39.7 |
| 3,582,371 | 6/1971 | Bruno et al. | 106/39.7 |
| 3,985,533 | 10/1976 | Grossman | 106/39.7 |
| 4,042,362 | 8/1977 | MacDowell et al. | 106/39.7 |
| 4,057,434 | 11/1977 | Rittler | 106/39.7 |

*Primary Examiner*—Helen M. McCarthy
*Attorney, Agent, or Firm*—Kees van der Sterre; Clinton S. Janes, Jr.

[57] ABSTRACT

Glasses in the $Li_2O$-$Al_2O_3$-$SiO_2$-$MgO$-$ZnO$-$TiO_2$ composition field, additionally containing PbO and/or one of $B_2O_3$, $Na_2O$ and $P_2O_5$ are rapidly crystallized to beta-spodumene glass-ceramics at temperatures not exceeding 1000° C. to provide white, opaque glass-ceramic products exhibiting both low thermal expansion and good chemical durability.

7 Claims, No Drawings

RAPIDLY CRYSTALLIZED BETA-SPODUMENE GLASS-CERAMIC MATERIALS

This is a division of application Ser. No. 848,862, filed Nov. 7, 1977 now abandoned.

BACKGROUND OF THE INVENTION

The present invention is in the field of glass-ceramics and relates to the production of glass-ceramic materials wherein crystals of beta-spodumene solid solution make up the principal crystal phase.

Glass-ceramic materials are crystalline or semi-crystalline materials produced by the in situ crystallization of glasses. They are typically produced in accordance with a process comprising, first, compounding and melting a batch for a glass which includes nucleating agents to promote glass crystallization; secondly, forming the molten glass into a glass article of the desired configuration; and thirdly, heat treating the glass article in accordance with a time-temperature schedule which promotes the formation of crystal nuclei and the subsequent growth of crystals thereon. Following the crystallization step to completion provides a highly crystalline material wherein the crystals are uniform in size, fine-grained, and uniformly dispersed in a minor residual glassy matrix. The proportion of crystals in a glass-ceramic material is typically quite high, being over 50% and usually over 75% by weight. For a further discussion of glass-ceramic materials and their manufacture, reference may be made to U.S. Pat. No. 2,920,971 to Stookey, and to numerous other texts and patents dealing with this relatively new branch of ceramic technology.

The production of glass-ceramic materials wherein beta-spodumene solid solution comprises the principal crystal phase involves the crystallization of glasses in the $Li_2O$-$Al_2O_3$-$SiO_2$ composition field. Examples of such glasses, and procedures whereby they may be converted into beta-spodumene glass-ceramics, are disclosed in U.S. Pat. No. 2,920,971, as well as in U.S. Pat. Nos. 2,960,801; 2,960,802; 3,148,994; 3,157,522; 3,582,371 and numerous others. Beta-spodumene glass-ceramics have been produced which are white and opaque, and which exhibit good thermal shock resistance by virtue of a very low thermal expansion coefficient.

There are many applications for white, opaque, chemically durable glass-ceramic materials exhibiting low coefficients of thermal expansion. For example Corning Code 9608 glass-ceramic material, a white, opaque beta-spodumene glass-ceramic material comprising about 69.5% $SiO_2$, 17.6% $Al_2O_3$, 2.7% $Li_2O$, 2.6% MgO, 1.0% ZnO, 4.7% $TiO_2$, 0.2% $ZrO_2$, 0.9% $As_2O_3$ and, 0.03% by weight, has been extensively utilized for the manufacture of glass-ceramic cookware. This material exhibits good chemical durability and an average linear coefficient of thermal expansion over the temperature range 25°–300° C. falling in the range of about 10 to about $15 \times 10^{-7}$/° C.

It has been customary in the production of white, opaque glass-ceramics of the beta-spodumene type to utilize crystallization heat treatments comprising peak crystallization temperatures on the order of 1100° C., and crystallization times at peak temperature on the order of 2–4 hours. The heat treatment of lithium aluminosilicate glasses at lower temperatures or for shorter times normally provides transparent to translucent glass-ceramics and/or glass-ceramics containing beta-quartz or beta-eucryptite in substitution for or in addition to the desired beta-spodumene crystal phase.

Methods by which white, opaque beta-spodumene glass-ceramics could be produced from lithium aluminosilicate glasses at lower crystallization temperatures or using shorter crystallization times could have substantial economic value, especially if significant overall energy savings could result therefrom. Such considerations have led to the recent development of spontaneous beta-spodumene glass-ceramics which are provided by the spontaneous crystallization of $Li_2O$-$Al_2O_3$-$SiO_2$-$TiO_2$ glasses of specified composition as they are formed and cooled from the melt. U.S. Pat. No. 3,985,533 to Grossman, for example, describes one family of beta-spodumene glass-ceramics not requiring a post-forming heat treatment to achieve crystallization. However, spontaneous beta-spodumene glass-ceramics are typically higher in thermal expansion and lower in chemical durability than beta-spodumene glass-ceramics produced by more conventional processes.

It is a principal object of the present invention to provide a white, opaque beta-spodumene glass-ceramic material exhibiting both good chemical durability and low thermal expansion which is produced utilizing a crystallization heat treatment employing lower temperatures and shorter times than have been required for the production of such material in the prior art.

It is a further object of the invention to provide thermally crystallizable glass compositions which can be converted to white, opaque glass-ceramics using such a heat treatment.

It is a further object of the invention to provide an improved process for the production of white, opaque beta-spodumene glass-ceramics exhibiting low thermal expansion and good chemical durability.

Other objects and advantages of the invention will become apparent from the following detailed description thereof.

SUMMARY OF THE INVENTION

We have now discovered specific thermally crystallizable lithium aluminosilicate glass compositions which can be converted to white, opaque beta-spodumene glass-ceramics offering good chemical durability and low thermal expansion by processing at peak crystallization temperatures not exceeding about 1000° C. Moreover, conversion can be completed by exposure to temperatures in the crystallization range of 900°–1000° C. for crystallization times not exceeding about 2 hours. By employing these compositions, beta-spodumene glass-ceramics exhibiting properties essentially equivalent to many of the presently available materials may be produced at lower cost and using less energy.

Compositions suitable for producing beta-spodumene glass-ceramics in accordance with the invention are of two basic types. Compositions of the first type contain additions of PbO (about 1.5–4.7% by weight), and are relatively low in $SiO_2$ (63–67%) and high in $Al_2O_3$ (18–21%). Compositions of the second type contain minor amounts of $Na_2O$, $B_2O_3$ and/or $P_2O_5$ (0.2–2.2% total by weight), and are relatively high in $SiO_2$ (68–71%) and low in $Al_2O_3$ (16–18%). Both composition types lie in the $SiO_2$-$Al_2O_3$-MgO-ZnO-$Li_2O$-$TiO_2$ composition system.

In addition to the property of rapid crystallization at low crystallization temperatures, these compositions exhibit very little deformation during ceramming (crystallization in situ). Hence glass-ceramic products may be provided therefrom without the need for formers during the crystallization process, a factor which further reduces the cost of production. The main advantages of these compositions, however, are that low thermal expansion and high durability in combination with dense white opacity are obtainable therewith.

Applications for the products of the invention may be envisioned wherever usage at high temperatures or under adverse conditions of thermal shock is required. The present glass-ceramics are strengthenable by lamination techniques, particularly differential densification strengthening, and could be used alone or in combination with other materials to provide strong, durable sheet, tubing, vessels for cooking or the like, and many similar articles.

DETAILED DESCRIPTION

The first step in the production of glass-ceramic materials in accordance with the invention involves the selection of a glass for crystallization which falls within one of two related glass composition ranges providing white opaque products at low temperatures. These ranges, which are hereinafter referred to as Range I and Range II, may be specifically defined as follows:

Range I—glass compositions consisting essentially, in weight percent on the oxide basis, of about 63–67% $SiO_2$, 18–21% $Al_2O_3$, 3.0–5.0% $Li_2O$, 1.0–2.5% MgO, 0.4–2.5% ZnO, 4.0–5.0% $TiO_2$, 1.5–4.7% PbO, 0–1.0% $B_2O_3$, 0–1.0% $Na_2O$, 0–2% $P_2O_5$, and 0–2% total of $B_2O_3+Na_2O+P_2O_5$; and Range II—glass compositions consisting essentially in weight percent on the oxide basis, of about 68–71% $SiO_2$, 16–18% $Al_2O_3$, 3.0–5.0% $Li_2O$, 1.0–2.5% MgO, 0.4–2.5% ZnO, 4.0–5.0% $TiO_2$, 0–1.0% $B_2O_3$, 0–1.0% $Na_2O$, 0–2% $P_2O_5$, and 0.2–2.2% total of $B_2O_3+Na_2O+P_2O_5$.

Since composition is critical in achieving the objects of the invention, careful observance of the above-defined composition limitations is required. For example, the range of $Li_2O$ concentration in these glasses is somewhat higher than in some prior art beta-spodumene compositions; however, we have found that at least about 3% $Li_2O$ is required to provide a white, opaque beta-spodumene material at low crystallization temperatures. Compositions containing less $Li_2O$, when crystallized as herein described, typically provide beta-quartz glass-ceramics and/or glass-ceramics which are gray and translucent instead of white and opaque.

Similarly, the concentrations of MgO and ZnO are critical to the invention, since excess quantities of these composition constituents tend to raise the crystallization temperature needed to achieve dense white opacity in the product. For example, a thermally crystallizable glass having a composition approximating that of the Corning Code 9608 glass-ceramic above described, including about 2.7% $Li_2O$ and 2.6% MgO by weight, produces a glass-ceramic material exhibiting bluish-gray translucency when crystallized using a peak crystallization temperature of 1000° C. for 2 hours. Hence higher peak temperatures are customarily utilized to produce white, opaque beta-spodumene glass-ceramic materials from this composition.

The relative concentrations of $SiO_2$ and $Al_2O_3$ in the thermally crystallizable glass are also important in achieving opacity in the product. Although relatively high quantities of $Al_2O_3$ (18–21%) and low quantities of $SiO_2$ (63–67%) may be utilized when lead oxide is present in the specified proportions, lower quantities of $Al_2O_3$ (16–18%) and higher quantities of $SiO_2$ (68–71%) must be used when PbO is absent. Hence, a thermally crystallizable glass having a composition approximating that of Corning Code 9617 glass-ceramic (containing, inter alia, about 66.7% $SiO_2$, 20.5% $Al_2O_3$, 3.5% $Li_2O$, 1.6% MgO, 1.2% ZnO and 4.8% $TiO_2$ by weight, but being essentially free of PbO, $Na_2O$, $B_2O_3$, and $P_2O_5$) also provides a glass-ceramic material exhibiting gray translucency when crystallized using a peak crystallization temperature of 1000° C. for 2 hours. Here again, higher peak crystallization temperatures are customarily utilized to produce a white, opaque beta-spodumene glass-ceramic material from glass of this composition.

Specific examples of compositions for thermally crystallizable glasses which may be converted to durable, white, opaque, beta-spodumene glass-ceramics in accordance with the invention are set forth in Table I below. The compositions are reported in parts by weight on the oxide basis as calculated from the batch. All of the compositions shown may be compounded from conventional glass batch constituents and melted to form stable glasses in conventional melting units such as pots, tanks or crucibles at temperatures in the range of about 1600° C. in accordance with standard glass-melting practice.

Table I

|  | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| $SiO_2$ | 70.5 | 68.5 | 69.8 | 69.7 | 70.0 | 69.0 | 69.0 | 68.7 | 63.4 | 65.4 | 64.8 | 65.5 | 66.0 | 64.4 | 64.9 |
| $Al_2O_3$ | 17.2 | 17.8 | 17.8 | 17.8 | 17.5 | 17.5 | 17.8 | 20.3 | 20.3 | 19.5 | 19.6 | 19.1 | 19.3 | 18.8 | — |
| $Li_2O$ | 3.5 | 3.5 | 3.5 | 3.5 | 3.5 | 3.5 | 3.5 | 3.5 | 3.5 | 3.5 | 3.3 | 3.46 | 3.46 | 3.4 | 3.4 |
| MgO | 1.8 | 1.8 | 1.8 | 1.8 | 1.8 | 1.8 | 1.3 | 1.8 | 2.1 | 2.1 | 2.0 | 2.1 | 2.1 | 2.1 | 2.1 |
| ZnO | 0.8 | 1.6 | 1.2 | 1.2 | 0.8 | 1.6 | 2.4 | 1.2 | 0.5 | 1.0 | 1.0 | 1.0 | 1.0 | 1.0 | 1.0 |
| $TiO_2$ | 4.7 | 5.0 | 4.7 | 4.7 | 4.8 | 5.0 | 4.8 | 4.4 | 4.4 | 4.6 | 4.4 | 4.7 | 4.7 | 4.6 | 4.6 |
| $As_2O_3$ | 1.0 | 1.0 | 1.0 | 1.0 | 1.0 | 1.0 | 1.0 | 0.6 | 0.5 | 0.5 | 0.5 | 0.5 | 0.5 | 0.5 | 0.5 |
| $Na_2O$ | — | — | — | 0.3 | 0.15 | — | 0.15 | 0.2 | 0.2 | — | — | — | — | — | — |
| $B_2O_3$ | 0.5 | 0.5 | 0.2 | — | 0.35 | 0.2 | 0.35 | — | 0.5 | — | — | — | — | — | — |
| $P_2O_5$ | — | — | — | — | — | 0.4 | — | 2.0 | — | — | — | — | — | — | — |
| PbO | — | — | — | — | — | — | — | — | 4.7 | 2.6 | 4.4 | 3.0 | 3.0 | 3.0 | 3.0 |

All of the compositions shown in Table I include a minor amount (not more than about 1% by weight) of the fining agent $As_2O_5$ as an optional ingredient to improve glass quality. Of course, minor amounts of other compositions constituents may also be introduced into the glass, provided that they do not deleteriously affect the essential crystallization characteristics thereof, or the thermal expansion, opacity or chemical durability of the product.

Glass melts formed from compositions such as shown in Table I may be formed into glass articles of the desired configuration by methods such as drawing, rolling, pressing, blowing or any of the other well known forming techniques at glass viscosities usual for such forming processes. Thereafter the glasses may be crystallized to white, opaque beta-spodumene glass-ceramics utilizing thermal crystallization procedures of the type normally employed in the prior art, except that crystallization temperatures in excess of about 1000° C. and crystallization times in excess of about 2 hours are not required.

In general, best results are obtained by using a crystallization heat treatment which comprises a nucleation step such as is conventionally employed in the production of beta-spodumene glass-ceramics, involving exposure of the glass to a temperature between its annealing point and softening point for a time sufficient to develop crystal nuclei throughout its volume. A preferred crystallization heat treatment comprises an initial exposure of the glass to a nucleation temperature in the range of about 750°–800° C. for a time in the range of about 1–4 hours, followed by an exposure to a crystallization temperature in the range of about 900°–1000° C. for a time in the range of about 1–2 hours. Of course, other specific temperatures and times could alternatively be employed, as could treatments involving slow, essentially continuous heating through the nucleation and crystallization zones according to procedures well known in the art.

Examples of specific crystallization heat treatments which may be used to produce white, opaque glass-ceramic materials from glasses having compositions such as shown above in Table II are reported below in Table II. The Table includes a series of composition numbers, referring to the glass compositions so designated in Table I, followed by specific nucleation and crystallization steps for each glass, reported in terms of peak nucleation and crystallization temperatures in degrees celsius, and holding times at the peak temperatures in hours.

$13 \times 10^{-7}/°C$. over the temperature range 25°–300° C., and is typically within the range of about 5 to about $13 \times 10^{-7}/°C$.

Notwithstanding the fact that these glass-ceramic products are produced by rapid crystallization techniques, good chemical durability is demonstrated thereby. The alkali durability exhibited by these products is essentially equivalent to the commercially marketed beta-spodumene glass-ceramics hereinabove described, and although slightly higher weight losses on exposure to acid are observed, such weight losses tend not to be reflected by corresponding reductions in glass-ceramic surface quality (gloss). Most importantly, these glass-ceramics exhibit excellent resistance to detergent attack, a property which is critical for consumer-ware applications.

The acid durability of glass-ceramic materials is frequently gauged from the weight loss (in $mg/cm^2$) exhibited by a sample of known surface area after immersion in 5% aqueous HCl at 95° C. for 24 hours. Alkali durability can be determined from the weight loss occasioned by a similar immersion of glass-ceramic samples in 0.02 N aqueous $Na_2CO_3$ at 95° C. for six hours.

One test which has been devised to evaluate the detergent durability of glass-ceramic materials comprises the exposure of glass-ceramic samples to a hot (95° C.) detergent solution for repeated six-hour immersion periods, with the surface quality of the samples being evaluated after each immersion. For this test, we typically use a 0.3% aqueous solution of SUPER SOILAX detergent, commercially available from Economics Laboratories, St. Paul, Minnesota, and evaluate surface quality by applying a dye penetrant to the surface of the samples, allowing it to remain for 20 seconds, and then

TABLE II

| Composition No. | 1 | 2 | 3 | 4 |
|---|---|---|---|---|
| Crystallization Treatment | | | | |
| Nucleation (°C.-hr) | 800°-1 hr | 800°-4 hr | 800°-2 hr | 800°-2 hr |
| Crystallization (°C.-hr) | 900°-2 hr | 900°-1 hr | 950°-2 hr | 1000°-1 hr |

| Composition No. | 5 | 6 | 7 | 8 |
|---|---|---|---|---|
| Crystallization Treatment | | | | |
| Nucleation (°C.-hr) | 800°-1 hr | 800°-1 hr | 800°-1 hr | 780°-1 hr |
| Crystallization (°C.-hr) | 950°-2 hr | 950°-2 hr | 950°-2 hr | 975°-1 hr |

| Composition No. | 9 | 10 | 11 | 12 |
|---|---|---|---|---|
| Crystallization Treatment | | | | |
| Nucleation (°C.-hr) | 750°-2 hr | 780°-2 hr | 780°-2 hr | 780°-2 hr |
| Crystallization (°C.-hr) | 1000°-1 hr | 1000°-2 hr | 1000°-2 hr | 1000°-2 hr |

| Composition No. | 13 | 14 | 15 |
|---|---|---|---|
| Crystallization Treatment | | | |
| Nucleation (°C.-hr) | 780°-2 hr | 780°-2 hr | 780°-2 hr |
| Crystallization (°C.-hr) | 950°-2 hr | 950°-2 hr | 950°-2 hr |

The glass-ceramic products resulting from the crystallization of glasses such as shown in Table I employing heat treatments such as shown above in Table II are low-expansion products exhibiting a dense white opacity which is essentially equivalent to that exhibited by beta-spodumene glass-ceramics crystallized at higher temperatures. The average linear coefficient of thermal expansion of these glass-ceramics does not exceed about removing the dye by wiping or, if necessary, by a 30-second scouring. SPOTCHEK dye penetrant, marketed by Magneflux Corporation, Chicago, Ill. is a useful dye for this test. The total detergent immersion time which produces a sample from which this dye cannot be completely removed by scouring is a good relative measure of the detergent durability of a glass ceramic material.

Data for Corning Codes 9608 and 9617 glass-ceramics resulting from the above-described tests, together with corresponding data for several of the example glass-ceramic materials reported in Tables I and II above, are tabulated in Table III below. Included in the Table are weight loss values for a 24-hour exposure to hot acid (5% aqueous HCl at 95° C.) and a six-hour exposure to hot alkali (0.02 N aqueous $Na_2CO_3$ at 95° C.). Also included are minimum times for exposure to the aforementioned hot detergent solution which produce a visible persistent stain after contact with dye penetrant and cleaning as above described.

TABLE III

| Glass-Ceramic Material | 24-hour Weight Loss in Acid (mg/cm²) | 6-hour Weight Loss in Alkali (mg/cm²) | Minimum Hot Detergent Exposure for Persistent Stain |
| --- | --- | --- | --- |
| Corning code 9608 | 0.12 | 0.02 | 6 hrs. |
| Corning Code 9617 | 0.01 | 0.01 | 16 hrs. |
| Example 1 | 0.66 | 0.01 | >48 hrs. |
| Example 3 | 0.29 | <0.01 | >54 hrs. |
| Example 8 | 0.03 | 0.01 | 48 hrs |
| Example 15 | 0.48 | 0.01 | >24 hrs. |

The data presented in Table III are believed to be typical of glass-ceramic materials provided in accordance with the invention, thus serving to demonstrate the good chemical durability and excellent detergent durability exhibited thereby. From these data the suitability of these glass-ceramic materials for glass-ceramic cookware and other applications requiring dense white opacity, low thermal expansion and excellent detergent durability are readily apparent. The fact that such products may be provided by processing at lower temperatures and for shorter times than have been required for the production of prior art glass-ceramics further enhances the importance of those materials.

Although the foregoing examples and data are illustrative of materials and properties provided in accordance with the invention, it will be evident that compositions and glass-ceramic processing techniques other than those specifically described herein may be resorted to within the scope of the appended claims.

We claim:

1. A composition for a glass which is thermally crystallizable to a white, opaque, chemically durable, low-expansion beta-spodumene glass-ceramic at a crystallization temperature not exceeding about 100° C. for an exposure interval not exceeding about 2 hours in the crystallization range of about 900°–1000° C. said glass having a composition falling within one of Ranges I and II below, wherein
   Range I includes compositions consisting essentially in weight percent, of about 63–67% $SiO_2$, 18–21% $Al_2O_3$, 3.0–5.0% $Li_2O$, 1.0–2.5% MgO, 0.4–2.5% ZnO, 4.0–5.0% $TiO_2$, 1.5–4.7% PbO, 0–1.0% $B_2O_3$, 0–1.0% $Na_2O$, 0–2.0% $P_2O_5$, and 0–2% total of $B_2O_3+Na_2O+P_2O_5$; and
   Range II includes compositions consisting essentially, in weight percent, of about 68–71% $SiO_2$, 16–18% $Al_2O_3$, 3.0–5.0% $Li_2O$, 1.0–2.5% MgO, 0.4–2.5% ZnO, 4.0–5.0% $TiO_2$, 0–1.0% $B_2O_3$, 0–1.0% $Na_2O$, 0–2.0% $P_2O_5$, and 0.2–2.2% total of $B_2O_3+Na_2O+P_2O_5$.

2. A composition in accordance with claim 1 which consists essentially, in weight percent on the oxide basis, of about 63–67% $SiO_2$, 18–21% $Al_2O_3$, 3.0–5.0% $Li_2O$, 1.0–2.5% MgO, 0.4–2.5% ZnO, 4.0–5.0% $TiO_2$, 1.5–4.7% PbO, 0–1.0% $B_2O_3$, 0–1.0% $Na_2O$, 0–2.0% $P_2O_5$, and 0–2.0% total of $B_2O_3+Na_2O+P_2O_5$.

3. A composition in accordance with claim 1 which consists essentially, in weight percent on the oxide basis, of about 68–71% $SiO_2$, 16–18% $Al_2O_3$, 3.0–5.0% $Li_2O$, 1.0–2.5% MgO, 0.4–2.5% ZnO, 4.0–5.0% $TiO_2$, 0–1.0% $B_2O_3$, 1–1.0% $Na_2O$, 0–2.0% $P_2O_5$, and 0.2–2.2% total of $Na_2O+B_2O_3+P_2O_5$.

4. A white, opaque, chemically durable, low-expansion glass-ceramic material comprising beta-spodumene solid solution as the principal crystal phase, said material being produced by
(a) selecting for crystallization a glass having an oxide composition falling within one of Ranges I and II below, wherein:
   Range I includes compositions consisting essentially, in weight percent, of about 63–67% $SiO_2$, 18–21% $Al_2O_3$, 3.0–5.0% $Li_2O$, 1.0–2.5% MgO, 0.4–2.5% ZnO, 4.0–5.0% $TiO_2$ 1.5–4.7% PbO, 0–1.0% $B_2O_3$, 0–1.0% $Na_2O$, 0–2.0% $P_2O_5$, and 0–2% total of $B_2O_3+Na_2O+P_2O_5$; and
   Range II includes compositions consisting essentially, in weight percent, of about 68–71% $SiO_2$, 16–18% $Al_2O_3$, 3.0–5.0% $Li_2O$, 1.0–2.5% MgO, 0.4–2.5% ZnO, 4.0–5.0% $TiO_2$, 0–1.0% $B_2O_3$, 0–1.0% $Na_2O$, 0–2.0% $P_2O_5$, and 0.2–2.2% total of $B_2O_3+Na_2O+P_2O_5$; and
(b) converting the selected glass to a white, opaque glass-ceramic material utilizing a crystallization heat treatment wherein the crystallization temperature does not exceed about 1000° C. and the time of exposure to crystallization temperatures in the range of about 900°–1000° C. does not exceed about 2 hours; said glass-ceramic material exhibiting an average linear coefficient of thermal expansion (25°–300° C.) not exceeding about $13\times10^{-7}/°C$. and excellent detergent durability.

5. A glass-ceramic material in accordance with claim 4 which is produced by selecting for crystallization a glass having a composition consisting essentially, in weight percent on the oxide basis, of about 63–67% $SiO_2$, 18–21% $Al_2O_3$, 3.0–5.0% $Li_2O$, 1.0–2.5% MgO, 0.4–2.5% ZnO, 4.0–5.0% $TiO_2$, 1.5–4.7% PbO, 0–1.0% $B_2O_3$, 0–1.0% $Na_2O$, 0–2.0% $P_2O_5$, and 0–2.0% total of $B_2O_3+Na_2O+P_2O_5$.

6. A glass-ceramic material in accordance with claim 4 which is produced by selecting for crystallization a glass having a composition consisting essentially, in weight percent on the oxide basis, of about 68–71% $SiO_2$, 16–18% $Al_2O_3$, 3.0–5.0% $Li_2O$, 1.0–2.5% MgO, 0.4–2.5% ZnO, 4.0–5.0% $TiO_2$, 0–1.0% $B_2O_3$, 0–1.0% $Na_2O$, 0–2.0% $P_2O_5$, and 0.2–2.2% total of $Na_2O+B_2O_3+P_2O_5$.

7. A glass-ceramic material in accordance with claim 4 which is produced utilizing a heat treatment comprising an exposure to a nucleation temperature in the range of about 750°–800° C. for a time in the range of about 1–4 hours followed by an exposure to a crystallization temperature in the range of about 900°–1000° C. for a time in the range of about 1–2 hours.

* * * * *

UNITED STATES PATENT AND TRADEMARK OFFICE
CERTIFICATE OF CORRECTION

PATENT NO. : 4,212,678

DATED : July 15, 1980

INVENTOR(S) : Kenneth Chyung and John E. Megles

It is certified that error appears in the above-identified patent and that said Letters Patent are hereby corrected as shown below:

Column 1, line 6, delete "now abandoned" and after Nov. 7, 1977, insert --now Patent No. 4,192,665, issued March 11, 1980.--

Columns 3 and 4, Table I, under Example 7 for $Al_2O_3$, change "17.8" to --17.5--.

Columns 3 and 4, Table I, under Example 8 for $Al_2O_3$, change "20.3" to --17.8--.

Columns 3 and 4, Table I, under Example 10 for $Al_2O_3$, change "19.5" to --20.3--.

Columns 3 and 4, Table I, under Example 11 for $Al_2O_3$, change "19.6" to --19.5--.

Columns 3 and 4, Table I, under Example 12 for $Al_2O_3$, change "19.1" to --19.6--.

Columns 3 and 4, Table I, under Example 13 for $Al_2O_3$, change "19.3" to --19.1--.

Columns 3 and 4, Table I, under Example 14 for $Al_2O_3$, change "18.8" to --19.3--.

Columns 3 and 4, Table I, under Example 15, add "18.8".

UNITED STATES PATENT AND TRADEMARK OFFICE
CERTIFICATE OF CORRECTION

PATENT NO. : 4,212,678          PAGE 2 of 2

DATED : July 15, 1980

INVENTOR(S) : Kenneth Chyung and John E. Megles

It is certified that error appears in the above-identified patent and that said Letters Patent are hereby corrected as shown below:

Column 4, line 57, change "compositions" to --composition--.

Signed and Sealed this

Twentieth Day of January 1981

[SEAL]

Attest:

RENE D. TEGTMEYER

Attesting Officer      Acting Commissioner of Patents and Trademarks